United States Patent [19]

Hiramatsu et al.

[11] Patent Number: 4,793,216
[45] Date of Patent: Dec. 27, 1988

[54] CONTROL APPARATUS FOR AUTOMATIC TRANSMISSION GEAR SYSTEM FOR VEHICLE

[75] Inventors: Takeo Hiramatsu; Yuichi Tanaka; Hisaji Nakamura, all of Kyoto, Japan

[73] Assignee: Mitsubishi Jidosha Kogyo Kabushiki Kaisha, Tokyo, Japan

[21] Appl. No.: 46,987

[22] Filed: May 5, 1987

[30] Foreign Application Priority Data

May 8, 1986 [JP] Japan ................. 61-105137

[51] Int. Cl.⁴ .............................................. B60K 41/18
[52] U.S. Cl. ..................................... 74/866; 364/424.1
[58] Field of Search ........................ 74/866; 364/424.1

[56] References Cited

U.S. PATENT DOCUMENTS

| | | | |
|---|---|---|---|
| 2,995,957 | 8/1961 | Wilson et al. | 74/752 |
| 3,942,393 | 3/1976 | Forster et al. | 74/866 |
| 3,956,947 | 5/1976 | Leising et al. | 74/866 |
| 4,485,443 | 11/1984 | Knodler et al. | 74/866 X |
| 4,517,859 | 5/1985 | Nagaoka et al. | 74/866 |
| 4,671,139 | 6/1987 | Downs et al. | 74/866 |
| 4,680,988 | 7/1987 | Mori | 364/424.1 X |

FOREIGN PATENT DOCUMENTS

0222654  12/1984  Japan ..................................... 74/866

*Primary Examiner*—Dirk Wright
*Attorney, Agent, or Firm*—Hedman, Gibson, Costigan & Hoare

[57] ABSTRACT

A control apparatus controls engaging states of first and second engaging elements selectively engaged with an input shaft during a gearshift operation. During downshift from a relatively high speed ratio to a relatively low speed ratio, the control apparatus controls such that the first engaging element is moved to a position immediately before engagement or to an initial engaging position, rotation speed of the input shaft changes with a first changing rate until a transmission gear system reaches predetermined speed and changes with a second changing rate after that, and when the rotation speed of the input shaft corresponds to that of the relatively low speed, an engaging force of the first engaging element is increased.

5 Claims, 8 Drawing Sheets

CONTROL APPARATUS FOR AUTOMATIC TRANSMISSION GEAR SYSTEM FOR VEHICLE

BACKGROUND OF THE INVENTION

The present invention relates to a control apparatus for an automatic transmission gear system for vehicle, having a function for reducing change in output torque change during gearshift.

As disclosed in Japanese Patent Publication No. 54-35631, page 7, column 13, lines 5 to 25, automatic transmission gear system for vehicle is controlled such that, e.g., during "power on" downshift from the third speed to the second speed, an engaging force of a disengaging-side engaging element (clutch 17) and that of an engaging-side engaging element (brake 18) are properly overlapped with each other so as to reduce a downshift shock.

In an automatic transmission gear system for vehicle having the above arrangement, the engaging-side engaging element is started to be engaged substantially at the same time the disengaging-side engaging element is started to be disengaged, so that excessive running up of an engine during "power on" downshift (i.e., an engine coupled to an input shaft of a transmission tends to excessively rotate when the disengaging-side engaging element is started to be disengaged) is prevented and a drop in an output shaft torque is reduced because of simultaneous disengagement of the disengaging- and engaging-side engaging elements. However, since it is difficult to properly control a time interval of an overlapping period or a timing at which the engaging-side engaging element is started to be engaged, the above object cannot be sufficiently achieved.

SUMMARY OF THE INVENTION

It is, therefore, an object of the present invention to provide a control apparatus for an automatic transmission gear system for vehicle, which is simple in structure, and which can stably prevent change in an output torque during gearshift regardless of the engaging states of engaging elements.

According to the present invention which has been made in consideration of the above situation, there is provided a control apparatus for automatic transmission gear system for vehicle, comprising: an input shaft to which a driving force is transmitted; selectably engageable first and second engaging elements; control device having; an engaging element switching means for engaging the first engaging element and for disengaging the second engaging element so as to achieve gearshift from a relatively high speed ratio to a relatively low speed ratio; a controlling means for controlling engaging forces of both the engaging elements during the gearshift; an instructing means for generating an instruction signal for starting the gearshift; an input shaft rotation speed detecting means for detecting rotation speed of the input shaft; and changing rate detecting means for detecting changing rate of the rotation speed of the input shaft, wherein said control device, during from the relatively high speed ratio to the relatively low speed ratio, moves the first engaging element to a position immediately before engagement or to an initial engagement position, controls the engaging force of the second engaging element such that the rotation speed of the input shaft changes in accordance with a first changing rate until the transmission gear system reaches a predetermined operation state and that the rotation speed of the input shaft changes in accordance with a second changing rate after the transmission reaches said predetermined operation state, and increases the engaging force of the first engaging element when the rotation speed of said input shaft corresponds to that of the relatively low speed ratio.

In the control apparatus having the above arrangement, only the engaging force of the second engaging element is controlled to vary the rotation speed of the input shaft in accordance with the predetermined changing rate, and after the rotation speed of the input shaft corresponds to that obtained when the relatively low speed ratio is achieved, i.e., effective gearshift is completed, the first engaging element waiting at the position immediately before engagement or at the initial engaging position is started to be engaged. Therefore, the gearshift with less drop in the output shaft torque can be achieved without accurately controlling an interval in which the engaging forces of the first and second engaging elements are overlapped with each other.

More specifically, according to the above arrangement, when the rotation speed ratio of the input/output shafts of the transmission is changing during gearshift, torque transmission with respect to the output shaft is performed by the second engaging element, and after the change in the rotation speed ratio is completed (i.e., the effective gearshift is completed), the element for performing the torque transmission is switched from the second engaging element to the first engaging element. Therefore, when the element for performing the torque transmission is switched, overlapping between the engaging forces of both the elements need not be accurately controlled, and only the engaging force of the first engaging element need be increased to achieve gearshift with less output shaft torque fluctuations, i.e., less gearshift shock.

In addition, according to the above control apparatus, the speed ratio of the input/output shafts corresponds to that after gearshift is completed when the engaging force of the first engaging element is increased. Therefore, even if the engaging force is rapidly increased, gearshift shock is less generated, and gearshift is completed within a short period of time.

Furthermore, according to the above control apparatus, during gearshift, the input shaft rotation speed varies in accordance with the first changing rate until the transmission reaches the predetermined operation state, and the input shaft rotation speed varies in accordance with the second changing rate after the transmission gear system reaches the predetermined operation state. Therefore, by setting the first changing rate larger than the second changing rate, gearshift with less shock can be achieved without increasing a gearshift time.

BRIEF DESCRIPTION OF THE DRAWINGS

FIGS. 4A and 4B are flow charts for explaining a control state during gearshift according to the embodiment of the present invention, in which FIG. 4A is a flow chart for explaining a state of controlling an oil pressure with respect to clutch 28, and FIG. 4B is a flow chart for explaining a state of controlling an oil pressure with respect to brake 54.

DETAILED DESCRIPTION OF THE PRESENT EMBODIMENT

An embodiment of the present invention will now be described in detail with reference to the accompanying drawings.

Figure 1:
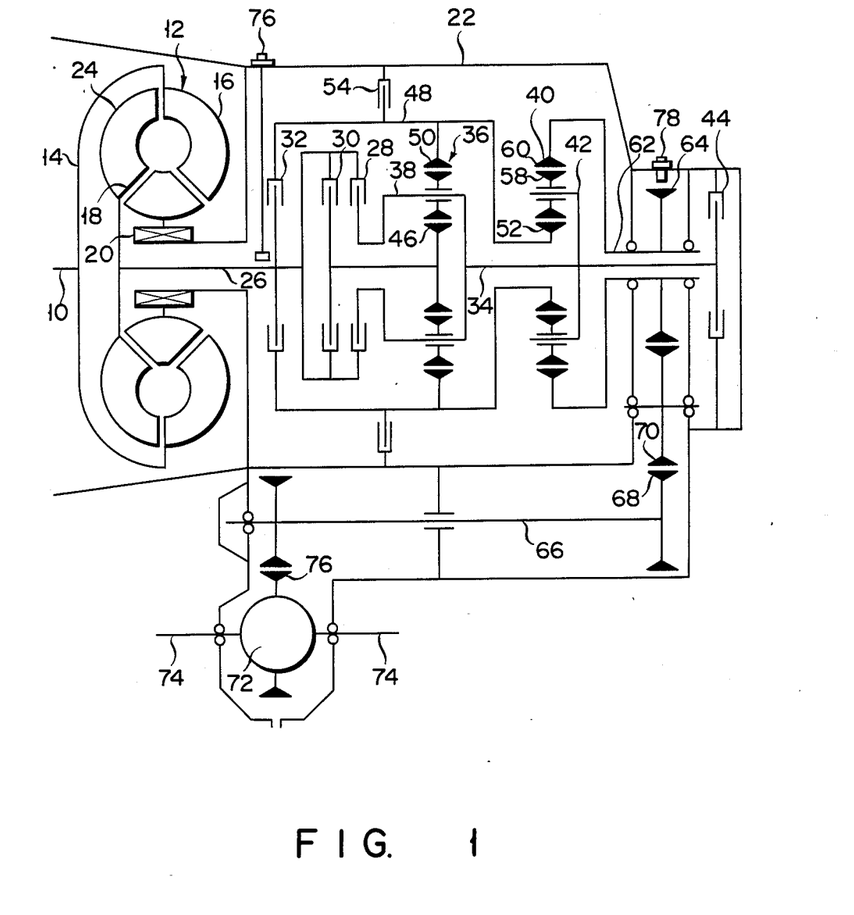
FIG. 1 is a diagram of a power train of an automatic transmission gear system for vehicle to which an embodiment of the present invention is applied.

In FIG. 1, driving shaft 10 directly connected to a crankshaft of an engine (not shown) is connected to pump 16 of torque converter 12 through input casing 14 of converter 12. Stator 18 of converter 12 is connected to gearshift casing 22 through one-way clutch 20. Turbine 24 of converter 12 is connected to clutches 28, 30, and 32 through input shaft 26. An output of clutch 28 is connected to first carrier 38 of first simple planetary gear unit 36 (to be simply referred to as first gear unit 36) and second carrier 42 of second simple planetary gear unit 40 (to be simply referred to as second gear unit 40) through first intermediate shaft 34, and is also connected to brake 44 for stopping rotation of shaft 34. An output of clutch 30 is connected to first sun gear 46 of first gear unit 36. An output of clutch 32 is connected to first ring gear 50 of first gear unit 36 and second sun gear 52 of second gear unit 40 through second intermediate shaft 48, and is also connected to brake 54 for stopping rotation of second intermediate shaft 48.

First gear unit 36 is constituted by gear 46, first pinion gear 56 meshing with gear 46, carrier 38 rotatably supporting gear 56 and capable of rotating itself, and gear 50 meshing with gear 56. Second gear unit 40 is constituted by gear 52, second pinion gear 58 meshing with gear 52, carrier 42 rotatably supporting gear 58 and capable of rotating itself, and second ring gear 60 meshing with gear 58. Gear 60 is connected to output gear 64 through hollow output shaft 62 in which shaft 34 is inserted.

Gear 64 meshes with driven gear 68 provided at the right side of intermediate transmission shaft 66 disposed substantially parallel to shaft 26 through idler 70. The left side of shaft 66 is connected to final reduction gear 76 connected to driving rotor 74 through differential gear unit 72.

As is apparent from FIG. 1, casing 22 is so formed as to accommodate the members including converter 12 to gear 64, and shaft 66, unit 72, and the like.

Figure 2A:
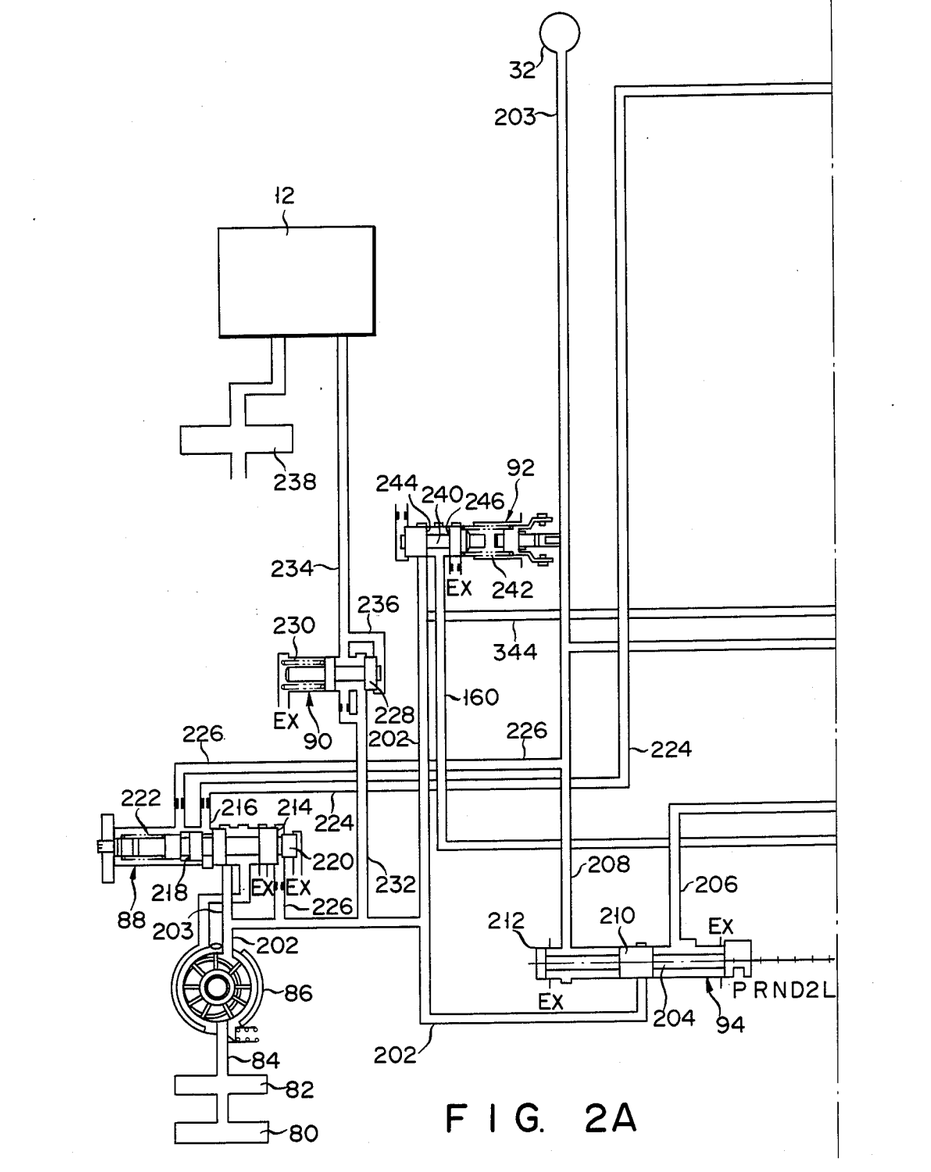
FIGS. 2A, 2B and 2C are circuit diagrams of an oil pressure control unit of the automatic transmission gear system for vehicle shown in FIG. 1.
Figure 2B:
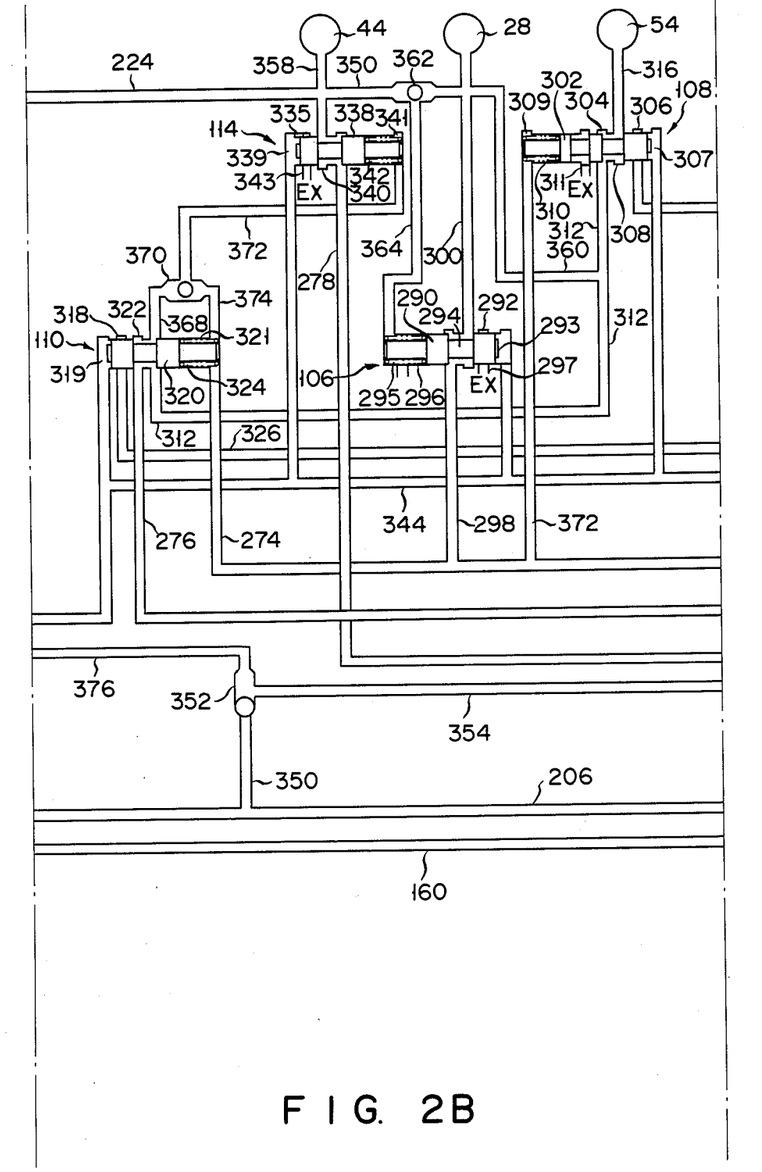
Figure 2C:
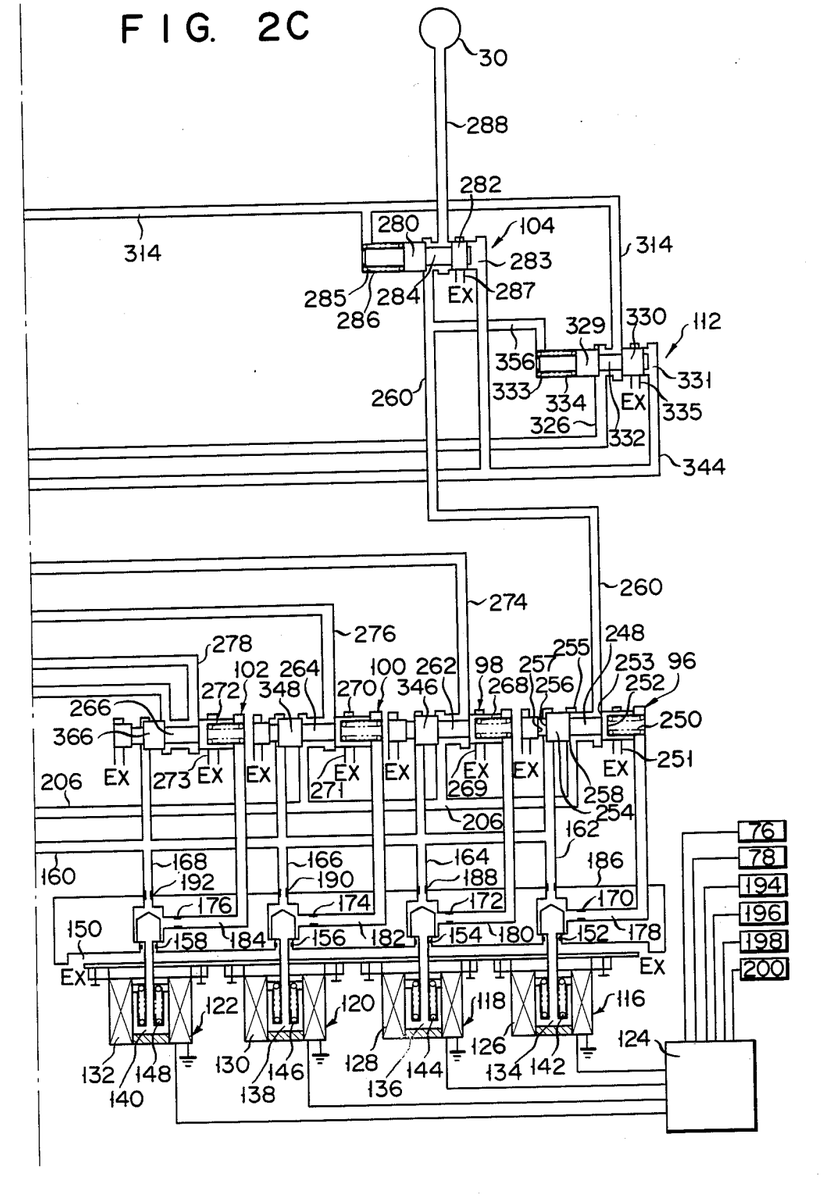

Each clutch and the brake described above respectively include an engaging piston unit or a servo unit to be described later, and engagement/disengagement is performed by charging/discharging an oil pressure. The oil pressure is selectively charged/discharged with respect to each clutch and the brake by an oil pressure control unit shown in FIG. 2. By combination of operations of clutches and brakes, gearshift ranges of 4 forward ranges and 1 reverse range can be achieved.

Note that reference numeral 76 denotes an input shaft rotation speed sensor for detecting rotation speed of shaft 26, and reference numeral 78 denotes a vehicle speed sensor for detecting rotation speed of gear 64 (which corresponds to the vehicle speed).

Table 1 shows the relationship between brake operations and gearshift states, in which symbol "o" represents engagement of clutches or brakes and symbol "—" denotes disengagement thereof.

TABLE 1

|  | Clutch 32 | Clutch 30 | Clutch 28 | Brake 54 | Brake 44 |
| --- | --- | --- | --- | --- | --- |
| 1st Speed | — | o | — | — | o |
| 2nd Speed | — | o | — | o | — |
| 3rd Speed | — | o | o | — | — |
| 4th Speed | — | — | o | o | — |
| Reverse | o | — | — | — | o |

In the above arrangement, when brake 44 engages with clutch 30, carriers 38 and 42 are fixed to become counterforce elements, so that a driving force from shaft 10 is transmitted to shaft 62 through converter 12, shaft 26, clutch 30, and gears 46, 56, 50, 52, 58, and 60, and is further transmitted to rotor 74 through gear 64, shaft 66, and gear 76, thereby achieving the 1st speed, as is apparent from FIG. 1.

When brake 44 is disengaged and brake 54 is engaged with engaged clutch 30, gears 50 and 52 are stopped to become counterforce elements, so that the driving force is transmitted to gear 64 through gear 46, carriers 38 and 42, gear 60, and shaft 62, thereby achieving the 2nd speed.

When brake 54 is disengaged and clutch 28 is engaged with engaged clutch 30, gear 46 and carrier 38 are rotated integrally with each other, so that entire unit 36 is rotated. Therefore, since gear 52 and carrier 42 are rotated with each other, entire unit 40 is rotated, thereby achieving the 3rd speed in which rotation speeds of shaft 26 and gear 64 equal each other.

When clutch 30 is disengaged and brake 54 is engaged with engaged clutch 28, gear 52 becomes a counterforce element, so that the driving force is transmitted to gear 64 through shaft 34, gears 52 and 58, carrier 42, and shaft 62, thereby achieving the 4th speed of overdrive in which rotation speed of gear 64 is faster than that of shaft 26.

When clutch 28 and brake 54 are disengaged and clutch 32 and brake 44 are engaged, carrier 42 becomes a counterforce element, so that the driving force is transmitted to gear 64 through shaft 48, gears 52, 58, and 60, and shaft 62, thereby achieving the gearshift range of reverse.

An oil pressure control apparatus in the transmission shown in FIG. 1, for achieving the gearshift ranges shown in Table 1 and an operation thereof will be described below.

The oil pressure control apparatus shown in FIGS. 2A to 2C supplies a pressurized oil delivered by variable delivery type oil pump 86 from oil pan 80 to converter 12 through oil pump filter 82 and oil passage 84 and selectively supplies it to clutches 28, 30, and 32, and brakes 44 and 54 of the transmission shown in FIG. 1 so as to operate them in correspondence with a driving state of a vehicle. The oil pressure control apparatus is mainly constituted by pressure regulating valve 88, torque converter control valve 90, pressure reducing valve 92, manual valve 94, first oil pressure control valve 96, second oil pressure control valve 98, third oil pressure control valve 100, fourth oil pressure control valve 102, first selector valve 104, second selector valve 106, third selector valve 108, fourth selector valve 110, fifth selector valve 112, sixth selector valve 114, first solenoid valve 116, second solenoid valve 118, third solenoid valve 120, and fourth solenoid valve 122, and the respective elements are connected by oil passages.

Valves 116, 118, 120, and 122 are three-way valves having an identical arrangement and operated in response to electrical signals from electronic control unit 124 to be described later. Coils 126, 128, 130, and 132, valve bodies 134, 136, 138, and 140, and springs 142, 144, 146, and 148 for biasing the valve bodies in one direction are respectively disposed in valves 116, 118, 120, and 122. When coils 126, 128, 130, and 132 are in a deenergized state, bodies 134, 136, 138, and 140 close orifices 152, 154, 156, and 158, respectively, so that oil passages 162, 164, 166, and 168 communicating with oil passage 160 respectively communicate with oil passages 178, 180, 182, and 184 in which orifices 170, 172, 174, and 176 are respectively formed. When the respective coils are in an energized state, the valve bodies close orifices 186, 188, 190, and 192 disposed in oil passages 162, 164, 166, and 168, respectively, so that oil passages 178, 180, 182, and 184 respectively communicate with those communicating with discharging port 150.

Unit 124 outputs a continuous current pulse to valves 116, 118, 120, and 122 in correspondence with the operation state of the vehicle to duty-control the oil pressure in passages 178, 180, 182, and 184. Main input elements of unit 124 are signals from sensors 76 and 78, valve opening sensor 194 for detecting a throttle valve opening of an engine (not shown), oil temperature sensor 196 for detecting a lubricant temperature, select position sensor 198 for detecting a selected position of a shift lever disposed in the interior of the vehicle, and auxiliary switch 200 for switching gearshift ranges, which are automatically shifted, between 3rd and 4th forward ranges.

The pressurized oil delivered from pump 86 to passage 202 is regulated to be a predetermined pressure by valve 88 and supplied to valves 90, 92, and 94.

Valve 94 has spool 204 capable of selecting 6 positions L, 2, D, N, R, and P. When one of positions L, 2, and D is selected, valve 94 causes passage 202 to communicate with passage 206 and causes the transmission to achieve the driving states of lst to 4th forward speeds in accordance with ON/OFF combinations of valves 116, 118, 120, and 122 (to be described later). When position N is selected, valve 94 disconnects passage 208 communicating with passage 206 and clutch 32 from passage 202 by lands 210 and 212 of spool 204, and causes passages 206 and 208 to communicate with exit ports formed in both sides thereof to achieve a neutral state. When position R is selected, valve 94 causes passage 202 to communicate with passage 208 and causes the transmission to achieve the reverse gearshift state (gearshift range). When position P is selected, land 210 of spool 204 closes passage 202, so that valve 94 causes the transmission to substantially achieve the neutral state.

Valve 88 includes spool 220 having pressure receiving surfaces 214, 216, and 218, and spring 222. When the gearshift range of 2nd, 3rd, or 4th speed is achieved, the oil pressure from passage 202 acts on surface 214 through passage 226 and is regulated to be a predetermined value (to be referred to as a first line pressure). When the gearshift range of the lst speed is achieved, the oil pressure from passage 202 acts on surface 214, and the oil pressure from passage 224 acts on surface 216, so that the oil pressure from passage 202 is regulated to be a predetermined value (to be referred to as a second line pressure) higher than the first line pressure.

When the reverse speed is achieved, the oil pressures from passages 202 and 224 as well as passage 226 communicating with passage 208 act on surfaces 214, 216, and 218, respectively, so that the oil pressure from passage 202 is regulated to be a predetermined value (to be referred to as a third line pressure) higher than the second line pressure.

Valve 90 has spool 228 and spring 230, and causes the oil pressure from passage 202, which is regulated by valve 88, to act on a pressure receiving surface at the right side of spool 228 through passages 232, 234, and 236. The oil pressure from passage 202 is regulated to be a predetermined pressure by balance with a biasing force of spring 230 and is supplied to converter 12 through passage 234. Note that the oil discharged from converter 12 is supplied to each lubricating portion of the transmission through oil cooler 238.

Valve 92 has spool 240 and spring 242. By balance between a biasing force of spring 242 and the oil pressure force generated by a difference in areas of pressure receiving surfaces 244 and 246 formed to oppose spool 240, valve 92 reduces the oil pressure from passage 202 to be a predetermined regulated oil pressure lower than the first line pressure and supplies the oil to spools (to be described later) of valves 96, 98, 100, and 102 through passage 160. The regulated oil pressure is further regulated in accordance with the operation states of valves 116, 118, 120, and 122 and acts on pressure receiving surfaces of the spools of valves 96, 98, 100, and 102.

Valve 96 has spool 248 and spring 250. By balance between the resultant forces consisting of a controlling oil pressure force along the left direction of FIGS. 2A and 2 which is increased/decreased in accordance with an increase/decrease in duty ratio of valve 116 and acts on pressure receiving surface 252 at the right side of spool 248 through passage 178 and a biasing force of spring 250 in the same direction, and the resultant forces (of the oil pressure force in the right direction of FIGS. 2A and 2B) generated by a difference between areas of pressure receiving surface 253 and pressure receiving surface 255 of land 254 and a difference between areas of pressure receiving surfaces 256 and 257, valve 96 controls the oil pressure applied from passage 206 to passage 260 to be a predetermined value in accordance with the duty ratio. When valve 116 is continuously energized, i.e., in the case of a duty ratio of 100%, the controlling oil pressure acting on surface 252 goes to 0, and spool 248 is displaced in the right direction of FIGS. 2A and 2B so that land 254 closes port 258 and oil passage 260 communicates with the oil exit. Therefore, the oil pressure is not applied to passage 260. On the contrary, in the case of a duty ratio of 0% (continuous deenergization), the regulated oil pressure acts on surface 252, and spool 248 is displaced in the left direction of FIGS. 2A and 2B to open port 258, so that the oil pressure from passage 206 is applied to passage 260 without being reduced.

Valves 98, 100, and 102 have the same arrangement as that of valve 96, and respectively include spools 262, 264, and 266, and springs 268, 270, and 272. In accordance with ON/OFF and the duty ratio of valves 118, 120, and 122, valves 98, 100, and 102 allow/inhibit communication between passage 206 and passages 274, 276, and 278 and control the oil pressures of passages 274, 276, and 278 to be predetermined values.

Valves 104 to 114 prevent erroneous operations of clutches and brakes so as to prevent the transmission from being locked up. When unit 124 is malfunctioned, valves 104 to 114 achieve gearshift ranges of reverse, neutral, and 3 forward speeds by switching valve 94. Valve 104 includes spool 284 having lands 280 and 282 with an identical area, spring 286 for biasing spool 284 in the right direction of FIGS. 2A and 2B, and oil pressure chambers 283 and 285 formed at both sides of spool 284. When the engine is operated, i.e., pump 86 is operated, the line pressure is normally applied to chamber 283, and when clutch 30 must be reliably disengaged, the oil pressure is applied to chamber 285. Resultant forces, consisting of the oil pressure to chamber 285 and a biasing force of spring 286 in the right direction of FIGS. 2A and 2B, overcome the oil pressure force applied to chamber 283 in the left direction due to the line pressure. These forces displace spool 284 in the right direction of FIGS. 2A and 2B. Therefore, passage 260 is disconnected from passage 288 by land 280, and passage 288 communicates with an oil exit (EX), thereby reliably disengaging clutch 30 to prevent erroneous operation thereof. When the oil pressure is not applied to chamber 285, the oil pressure of chamber 283 overcomes the biasing force of spring 286 and displaces spool 284 in the left direction, so that passage 260 communicates with passage 288 and clutch 30 becomes engageable.

Valves 106, 112, and 114 have the same arrangement as that of valve 104, and include spools 294, 332, and 340 each having two lands with an identical pressure receiving area, springs 296, 334, and 342 for biasing spools 294, 332, and 340, oil pressure chambers 293, 331, and 339 to which the line pressure is normally applied, and oil pressure chambers 295, 333, and 341 with respect to which the oil pressure is selectively charged/discharged. When the oil pressure is not applied to chambers 295, 333, and 341, lands 292, 330, and 336 close the oil exit, and passages 298, 326, and 278 respectively communicate with passages 300, 314, and 358. When the oil pressure is applied to chambers 295, 333, and 341, lands 290, 328, and 338 respectively close passages 298, 326, and 278, and passages 300, 314, and 358 communicate with the oil exit.

Valve 108 includes spool 308 having lands 302, 304, and 306 with an identical pressure receiving area, spring 310 for biasing spool 308 in the right direction of FIGS. 2A and 2B, oil pressure chamber 307 to which the line pressure is normally applied, and oil pressure chamber 309 to which the oil pressure is selectively applied. When the oil pressure is not applied to chamber 309, the oil exit (EX) is closed between lands 302 and 304, and passage 316 connected to brake 54 communicates with passage 312 connected to valve 110 to be described later. When the oil pressure is applied to chamber 309, passage 312 communicates with the oil exit (EX), and passage 316 communicates with passage 314 connected to chamber 285 of valve 104 and valve 112.

Valve 110 includes spool 322 having lands 318 and 320 with an identical pressure receiving area, spring 324, oil pressure chamber 319 to which the line pressure is applied, and oil pressure chamber 321 with respect to which the oil pressure is selectively charged/discharged, i.e., has substantially the same arrangement as that of each selector valve except valve 108. When the oil pressure is not applied to chamber 321, passage 276 to which the oil pressure is applied from valve 100 communicates with passage 368 connected to oil pressure chamber 341 of valve 114 through ball valve 370 and oil passage 372 and with passage 312. When the oil pressure is applied to chamber 321, land 320 closes passages 312 and 368, and passage 276 communicates with passage 326 connected to valve 112.

Note that the relationship between combinations of ON (energization)/OFF (deenergization) of valves 116, 118, 120, and 122 and gearshift ranges is as shown in Table 2.

TABLE 2

|  | First Solenoid Valve 116 | Second Solenoid valve 118 | Third Solenoid valve 120 | Fourth Solenoid valve 122 |
| --- | --- | --- | --- | --- |
| 1st Speed | OFF | ON | ON | OFF |
| 2nd Speed | OFF | ON | OFF | ON |
| 4th Speed | ON | OFF | OFF | ON |
| Reverse | OFF | OFF | OFF | OFF |

An operation of the above oil pressure control apparatus will be described below. When a driver of a vehicle sets a conventionally known selector lever (not shown) disposed in the interior of the vehicle at position P or N, valve 94 mechanically or electrically connected to the selector lever is set at position P or N. Thereafter, when an engine is started, the oil pressure in passage 202, which is generated by pump 86 and controlled to be a predetermined value by valve 88, is applied to converter 12 through passage 232, valve 90, and passage 234. The oil pressure is further regulated to be the regulated oil pressure by valve 92, and is applied to chamber 319 of valve 110 through passage 344, to chamber 339 of valve 114, to chamber 293 of valve 106, to chamber 307 of valve 108, to chamber 283 of valve 104, and to chamber 331 of valve 112. Therefore, spools 322 and 340 of valves 110 and 114 are displaced in the right direction of FIGS. 2A to 2C, and the other selector valves are displaced in the left direction thereof.

When the driver operates the selector lever to select position D, valve 94 is set at position D, and the oil pressure of passage 202 is applied to passage 206 through valve 94. Then, unit 124 generates a signal for energizing valves 118 and 120, for immediately deenergizing valve 122, and first for operating valve 116 with a predetermined duty ratio, then gradually reducing the duty ratio, and finally deenergizing valve 116.

Since bodies 136 and 138 of energized valves 118 and 120 are displaced upward in FIGS. 2A and 2B to close orifices 188 and 190, the oil pressure in passages 180 and 182 is discharged from port 150 respectively through orifices 172 and 174, and orifices 154 and 156. Therefore, the regulated oil pressure from passage 160, which acts on the pressure receiving surfaces at the left sides of lands 346 and 348 formed in spools 262 and 264 of valves 98 and 100, overcomes the biasing force of springs 268 and 270 and displaces spools 262 and 264 in the right direction of FIGS. 2A and 2B, so that passages 274 and 276 are disconnected from passage 206 and communicate with ports 269 and 271. Since body 140 of deenergized valve 122 closes orifice 158, the regulated oil pressure from passage 160 acts on the pressure receiving surface at the right side of spool 266 through passage 184 without being reduced, so that spool 266 is held at the left position of FIGS. 2A and 2B and passages 206 and 278 are held in a communication state through passage 350, valve 352, and passage 354. The oil pressure of passage 278 is applied to an oil pressure chamber (not shown) for operating brake 44 through valve 114 and passage 358, thereby operating brake 44. The oil pressure applied to passage 358 is applied to chamber 295 of valve 106 through passage 360, valve 362, and passage 364 and displaces spool 294 in the right direction of FIGS. 2A and 2B, so that passage 298 is closed by land 290 and aassage 300 communicates with the oil exit, thereby reliably holding clutch 28 in a disengaged state. The oil pressure of passage 358 further acts on surface 216 of valve 88 through passage 224, so that the oil pressure of passage 202 is regulated to be the second line pressure.

On the other hand, since valve 116 is first operated with the predetermined duty ratio, the oil pressure is supplied to passage 260. In this case, the pressure has a magnitude corresponding to a position of spool 248 where resultant forces consisting of the oil pressure determined by the above duty ratio and acting on the pressure receiving surface at the right side of spool 248 and a biasing force of spring 250 are balanced with the oil pressure acting on the respective pressure receiving surfaces of spool 248. The oil pressure is applied to clutch 30 through valve 104 and passage 288 and engages clutch 30 by the engaging force corresponding to the magnitude of the above oil pressure, and said oil pressure is also applied to chamber 333 of valve 112 through passage 356. When the duty ratio gradually decreases, the oil pressure of passage 260 gradually increases, so that the engaging force of clutch 30 increases and the pressure in chamber 333 of valve 112 also increases. Thereafter, when the oil pressure acting on the pressure receiving surface at the left side of land 328 and the biasing force of spring 334 exceed the oil pressure acting on the pressure receiving surface at the right side of land 330, spool 332 is displaced in the right direction of FIGS. 2A and 2B so that passage 314 communicates with port 335, and spool 284 is reliably displaced in the left direction so that passage 288 does not communicate with port 287. When the duty ratio becomes 0%, i.e., valve 116 is deenergized, the oil pressure of passages 260 and 288 becomes the second line pressure, and clutch 30 engages with the engaging force corresponding to the second line pressure, thereby achieving the 1st speed ratio.

When the gearshift range of the 1st speed is achieved in which a relatively large torque is transmitted, the second line pressure is applied to operate clutch 30 and brake 44. Therefore, the engaging force of brake 44 and clutch 30 is increased, so that a relatively large torque can be transmitted.

When the vehicle starts running and unit 124 determines that upshift to the gearshift range of the 2nd speed is required in accordance with a throttle opening signal, vehicle speed, and the like, unit 124 generates a signal for holding valve 116 in a deenergized state and valve 118 in an energized state, for gradually decreasing the duty ratio of valve 120, which is the duty ratio of 100%, i.e., in a complete energized state, to finally obtain the duty ratio of 0%, and for gradually increasing the duty ratio of valve 122, which is the duty ratio of 0%, i.e., in a complete deenergized state, to finally obtain the duty ratio of 100%.

Since valve 116 is held in the deenergized state, clutch 30 is also held in the engaged state, and since valve 118 is held in the energized state, passages 206 and 276 are kept disconnected from each other.

Since valve 122 in the state of the duty ratio of 0% (deenergized state) is controlled to increase the duty ratio, the oil pressure in passage 184 is reduced by causing passage 184 to gradually communicate with port 150, so that spool 266 is gradually displaced in the right direction of FIGS. 2A to 2C. Therefore, since passage 278 communicates with port 273 and the oil pressure in passage 278 is gradually reduced, the oil pressure in passage 358 communicating with passage 278 through valve 114 is also reduced, and the engaging force of brake 44 is gradually reduced. In addition, since the oil pressure in passage 224 communicating with passage 358 is also reduced, the oil pressure acting on surface 216 of valve 88 is reduced, spool 220 is balanced at a position where the oil pressure in passage 202 is reduced. When the duty ratio is further increased, the oil pressure in passages 278 and 358 is further reduced, so that the engaging force of brake 44 is further reduced and brake 44 is finally disengaged. In addition, the pressure in passage 202 is reduced to be finally (the duty ratio of 100%) set to the first line pressure.

Since valve 120 in the energized state of the duty ratio of 100% is controlled to gradually decrease the duty ratio, the oil pressure in passage 276 is gradually increased by gradually communicating passage 276 with passage 206 and is applied to valve 110. Part of the oil pressure is applied to brake 54 through passage 312, valve 108, and passage 316 to gradually operate brake 54 toward the engaging direction, and part of the oil pressure applied to passage 312 is applied to chamber 295 of valve 106 through passage 360, valve 362, and passage 364. Part of the oil pressure applied to valve 110 is applied to chamber 391 of valve 114 through passage 368, valve 370, and passage 372. When the duty ratio is further decreased and the oil pressure in passage 276 is further increased, the engaging force of brake 54 is further increased, and the oil pressure in chamber 295 of valve 106 and chamber 391 of valve 114 is increased. Thereafter, when resultant forces consisting of the above oil pressure and the biasing force of spring 296 or 342 exceed the oil pressure in chamber 293 or 339, spools 294 and 340 are displaced in the right and left directions in FIGS. 2A and 2B, respectively, so that passages 300 and 358 respectively communicate with ports 297 and 343, thereby discharging the residual pressure from passages 300 and 358.

Furthermore, when the duty ratio of valve 120 becomes 0% (deenergized), brake 54 engages by the engaging force corresponding to the first line pressure.

When the vehicle speed is further increased and unit 124 determines that an upshift from the 2nd speed to the 3rd speed is required, unit 124 holds valves 116 and 122 respectively in the deenergized and energized states, and generates a signal for gradually increasing the duty ratio of valve 120 from 0% (deenergized state) to finally 100% (energized state), as in the case of valve 122 during gearshift of the gearshift ranges from the 1st to 2nd speed ratio, and for gradually decreasing the duty ratio of valve 118 from 100% to finally 0%, as in the case of valve 120 during the same gearshift.

Since valve 116 is held in the deenergized state, the communication between passages 206 and 288 is maintained through valve 96, passage 260, and valve 104, thereby holding clutch 30 in the engaged state. In addition, since valve 122 is held in the energized state, communication between passage 278 and port 273 is maintained, so that brake 44 is not operated.

Furthermore, since valve 120 is operated with the duty ratio gradually increasing from 0%, spool 264 is gradually balanced in the right direction of FIGS. 2A to 2C, so that the oil pressure in passage 276 is gradually discharged from passage 271. Therefore, the engaging force of brake 54 communicating with passage 276 through valve 110, passage 326, valve 112, passage 314, valve 108, and passage 316 is gradually weakened, and at the same time, the oil pressure in chamber 295 of valve 106 is reduced, so that spool 294 is displaced in the left direction to cause passages 298 and 300 to communicate with each other. As the duty ratio approaches 100%, the oil pressure in passage 276 is further reduced to weaken the engaging force of brake 54, so that brake 54 is finally disengaged. In this state, brake 54 communicates with port 335 through passage 316, valve 108, passage 314, and valve 112, thereby preventing the erroneous operation of brake 54.

On the other hand, since the signal to valve 118 is gradually reduced from the duty ratio of 100%, spool 262 is gradually balanced in the left side of FIGS. 2A to 2C. Therefore, passages 274 and 206 gradually communicate with each other, so that the oil pressure in passage 274 is gradually increased and applied to chamber 321 of valve 110, chamber 341 of valve 114, and chamber 309 of valve 108, and is also applied to clutch 28 through valve 106, thereby operating clutch 28 toward the engaging direction. When the above duty ratio is further reduced, spool 322 of valve 110 and spool 340 of valve 114 are displaced in the left direction of FIGS. 2A and 2B, and spool 308 of valve 108 is displaced in the right direction thereof, so that passages 276, 358, 314, and 316 respectively communicate with passage 326, port 343 (for preventing erroneous operation of brake 44), passage 316, and port 311 and the engaging force of clutch 28 is increased. When the duty ratio becomes 0%, clutch 28 engages by the engaging force corresponding to the first line pressure, thereby achieving the 3rd speed ratio.

Thereafter, when the vehicle speed is further increased and unit 124 determines that the gearshift range must be shifted from the 3rd to 4th speed ratio, unit 124 holds valves 118 and 122 respectively in the deenergized and energized states, and generates a signal for gradually increasing the duty ratio of valve 116 from 0% to finally 100%, and for gradually decreasing the duty ratio of valve 120 from 100% to finally 0%.

Since valve 118 is held in the deenergized state, communication between passages 206 and 274 is maintained, and similar to the case of achieving the gearshift range of the 3rd speed, the first line pressure in passage 274 is applied to chamber 309 of valve 108 and chamber 321 of valve 110 through passage 372, and to chamber 341 of valve 114 through passages 374 and 372. Therefore, spools 308, 322, and 340 of valves 108, 110, and 114 are respectively held in the right, left, and left directions of FIGS. 2A and 2B. In addition, since the oil pressure in passage 274 is also applied to clutch 28 through passage 298, valve 106, and passage 300, clutch 28 is held in the engaged state.

Furthermore, since valve 122 is held in the deenergized state and passage 278 continuously communicates with port 273 as in the case of achieving the gearshift range of the 3rd speed, no oil pressure is generated in passage 278. Since passage 358 communicating brake 44 communicates with port 343 of valve 114, brake 44 is not erroneously operated.

Since the signal for operating valve 116 is controlled such that the duty ratio is gradually increased from 0%, the oil pressure in passage 178 is gradually reduced and spool 248 of valve 96 is balanced in the right direction of FIGS. 2A to 2C, so that passage 260 gradually communicates with port 251 of valve 96. Therefore, the oil pressure in passage 260 is gradually reduced to reduce the engaging force of clutch communicating with passage 260 through valve 104 and 288, and the oil pressure in chamber 333 of valve 112 is also reduced. When the duty ratio is increased and the oil pressure in passage 260 is reduced, the engaging force of clutch 30 is further weakened and the oil pressure in chamber 333 is reduced, so that spool 332 is displaced in the left direction of FIGS. 2A and 2B to cause passage 326 and 314 to communicate with each other. When the duty ratio goes to 100%, the pressure in passage 260 goes to 0 kg/cm$^2$, thereby disengaging clutch 30.

On the other hand, the signal for operating valve 120 is controlled such that the duty ratio is gradually decreased from 100%, the oil pressure in passage 182 is increased to balance spool 264 of valve 100 in the left direction of FIGS. 2A to 2C, so that passage 276 is disconnected from port 271 and gradually communicates with passage 206. Therefore, the oil pressure in passage 276 is applied to brake 54 through valve 110, passage 326, valve 112, passage 314, valve 108, and passage 316 to operate brake 54 toward the engaging direction, and is also applied to chamber 285 of valve 104. When the duty ratio is further decreased, the oil pressure in passage 276 is increased, so that the engaging force of brake 54 is also increased. Thereafter, when resultant forces consisting of the oil pressure force in chamber 285 and the biasing force of spring 286 exceed the oil pressure in chamber 283, spool 284 is displaced in the right direction of FIGS. 2A to 2C so that passage 288 communicates with port 287 to prevent erroneous operation of clutch 30. When the duty ratio becomes 0%, the pressure in passage 274 becomes the first line pressure, and brake 54 engages by the engaging force corresponding to the above line pressure, thereby achieving the 4th speed ratio.

The upshift operation from the 1st to 4th speed ratio has been described above. Since the downshift operation from the 4th to 1st speed ratio is performed in the order completely opposite to that of the above upshift operation, a detailed description thereof will be omitted.

In addition, when the selector lever is set at position 2 or L, gearshift is performed between the 1st and 2nd speed ratio or is fixed at the 1st speed ratio, by the instruction from unit 124. Therefore, the operation of the oil pressure circuit is the same as in the case of setting the selector lever at position D, thereby omitting a detailed description thereof.

When the driver of the vehicle shifts the selector lever to select position R and valve 94 is set at position R, passage 202 communicates with passage 208 and is disconnected from passage 206. In addition, unit 124 generates a signal for setting all the solenoid valves in the deenergized state. The oil pressure applied to passage 208 is applied to an oil pressure chamber (not shown) for operating clutch 32 to set clutch 32 in the engaged state. The above oil pressure is applied to valve 88 through oil passage 226 and acts on surface 218. This pressure is also applied to passages 358, 360, and 224 through passage 376, valve 352, passage 354, valve 102, passage 278, and valve 114.

The oil pressure applied to passage 358 is applied to an oil pressure chamber (not shown) for operating brake 44 to cause the chamber to operate it. The oil pressure applied to passage 360 is applied to chamber 295 of valve 106 through passage 360 and displaces spool 294 in the right direction of FIGS. 2A to 2C, so that land 290 closes passage 298 and passage 300 communicates with port 297, thereby preventing erroneous operation of clutch 28. In addition, the oil pressure applied to passage 224 is applied to valve 88 and acts on surface 216. Therefore, the oil pressure in passage 202 is increased to the third line pressure by the oil pressure acting on surfaces 216 and 218 so that brake 44 and clutch 32 are relatively strongly engaged with each other, thereby reliably obtaining sufficient torque capacities of brake 44 and clutch 32 when the reverse gearshift range is achieved in which the relatively large torque is assured.

When unit 124 is malfunctioned, unit 124 detects the malfunction and disables all the signals output to the solenoid valves, and displaces all the spool valves of the respective oil pressure control valves in the left direction of FIGS. 2A to 2C. Therefore, if only valve 94 is set at a position (D, 2, or L) for achieving the forward gearshift ranges and passage 202 communicates with passage 206, the line pressure is applied to the respective oil pressure control valves through passage 206. The oil pressure applied from valve 96 to passage 260 is applied to the oil pressure chamber at the left side of valve 112 and displaces spool 332 in the right direction of FIGS. 2A to 2C to disconnect passages 326 and 314 from each other, and is applied to clutch 30 through passage 228 to set clutch 30 in the engaged state.

The oil pressure applied to valve 98 is applied to passage 372 and the oil pressure chamber at the left side of valve 108 through passage 274 to displace spool 308 in the right direction of FIGS. 2A to 2C, and is applied to clutch 28 through passage 298, valve 106, and passage 300 to set clutch 28 in the engaged state. The above oil pressure is also applied to the oil pressure chamber at the right side of valve 110 and displaces spool 322 in the left direction of FIGS. 2A to 2C to cause passage 276 to communicate with passage 326, and is applied to the oil pressure chamber at the right side of valve 114 through passage 374, valve 370, and passage 372 and displaces spool 340 in the left direction of FIGS. 2A to 2C to disconnect passages 278 and 358 from each other. In addition, the oil pressure applied from valve 100 to passage 276 is applied to valve 112 through valve 110 and passage 326. However, since communication between passages 326 and 314 is inhibited by land 328 of valve 112, the oil pressure in passage 326 is not applied to passage 314. The oil pressure applied from valve 102 to passage 278 is applied to valve 114. However, since communication between passages 278 and 358 is inhibited by land 338, brake 44 is not operated.

Therefore, when unit 124 is malfunctioned and valve 94 is set at position D, 2, or L, clutches 28 and 30 are set in the engaged state, thereby achieving the 3rd speed ratio to at least operate the vehicle.

On the other hand, when unit 124 is malfunctioned and valve 94 is set at position R, an operation is the same as that in the case of obtaining the reverse speed, as is apparent from Table 2. That is, clutch 32 and brake 44 are operated to obtain the reverse speed when unit 124 is malfunctioned.

In the above description, valves 116 to 122 are simply duty-controlled to gradually charge/discharge the oil pressure during gearshift. However, an oil pressure control method having as its object to reduce gearshift shock will be described below by exemplifying gearshift of the gearshift ranges from the 3rd to 4th speed ratio during power-on with reference to FIGS. 3, 4A and 4B and 5.

Figure 3:
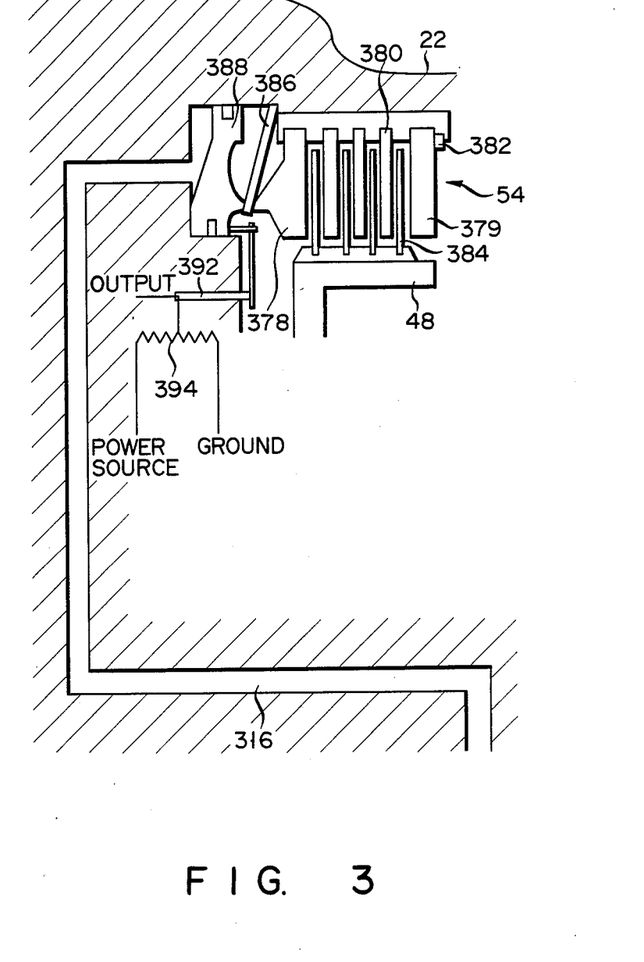
FIG. 3 is a schematic view showing an arrangement of brake 54 in FIG. 1.
Figure 4A:
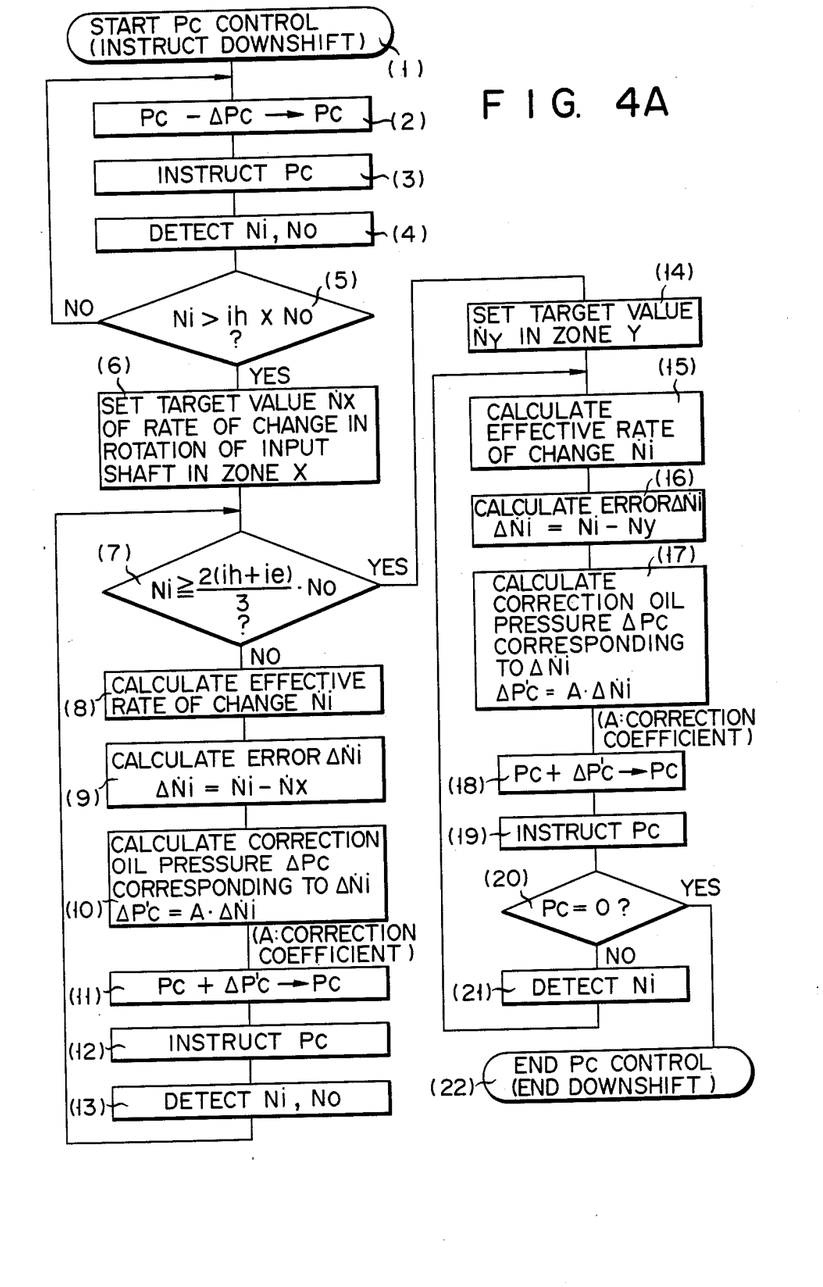
Figure 4B:
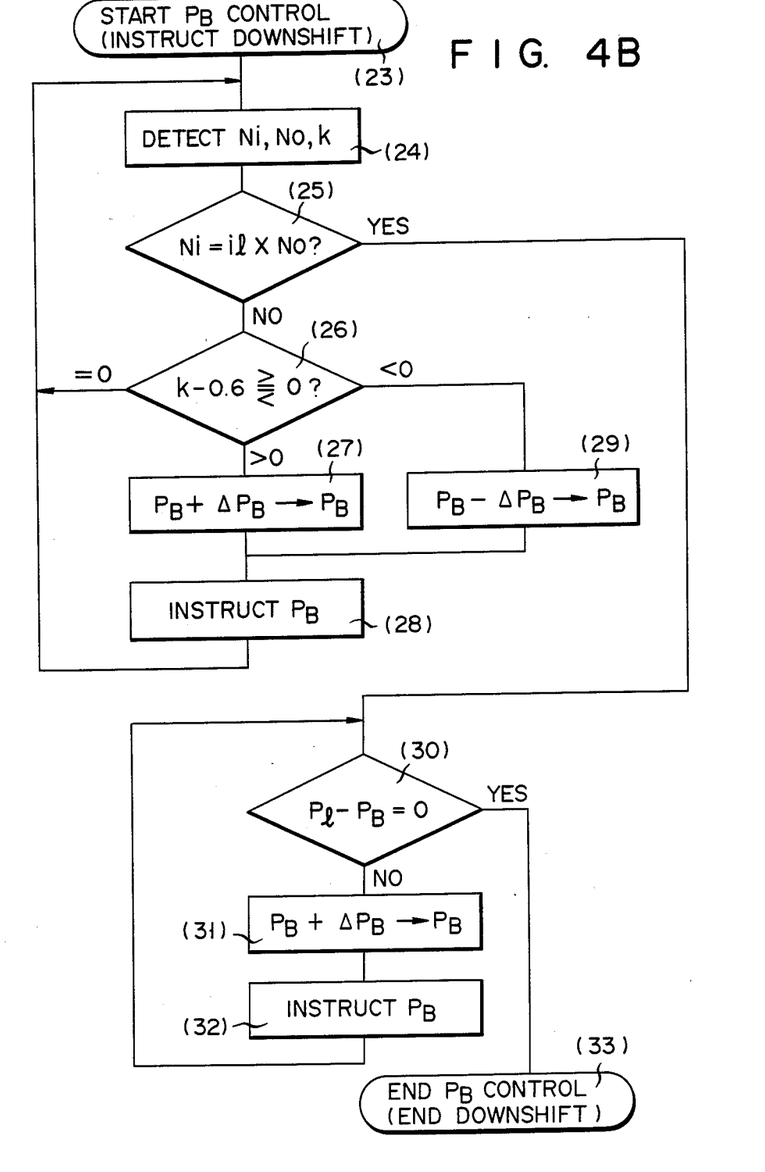
Figure 5:
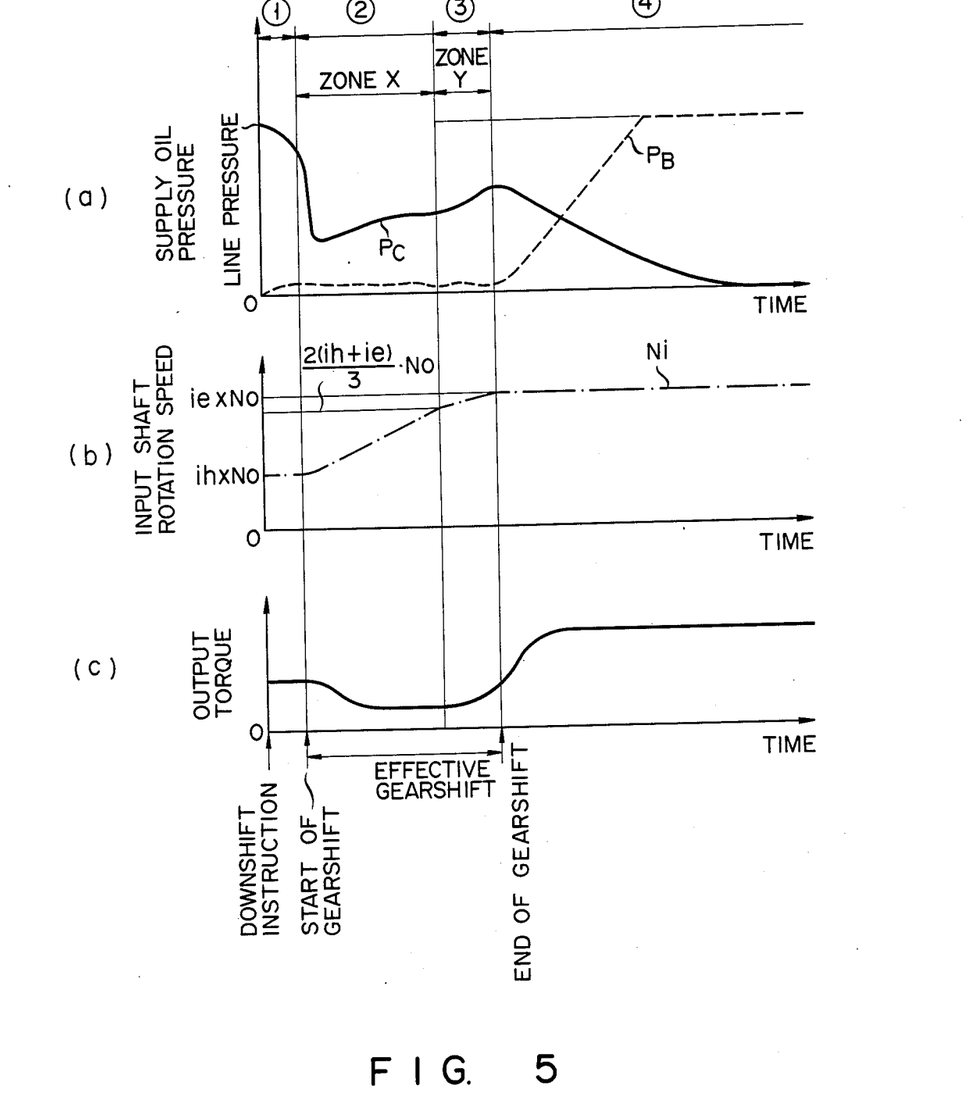
FIG. 5 is a graph showing characteristics of changes in changing elements which vary during gearshift of the automatic transmission gear system for vehicle according the embodiment of the present invention.

Note that FIG. 3 shows an arrangement of brake 54 shown in FIG. 1, FIGS. 4A and 4B are flow charts for controlling oil pressures $P_C$ and $P_B$ applied to clutch 28 and brake 54, and FIG. 5 shows graphs (a), (b), and (c) showing characteristics of changes in oil pressures $P_C$ and $P_B$ applied to clutch 28 and brake 54, the input shaft rotation speed, and the output shaft torque.

In FIG. 3, brake 54 includes: pressure plate 378, reaction plate 379, and a plurality of brake plates 380, all of which are slidably mounted on an inner surface of casing 22 along the longitudinal direction thereof (left-to-right direction of FIG. 3); snap ring 382, fixed on the inner surface of casing 22, for controlling sliding movement of plates 378 and 380 in the right direction of FIG. 3; brake discs 384, alternately disposed between plates 378 and 380, for sliding in the longitudinal direction of shaft 48; return spring 386 for abutting against plate 378; and piston 388 for abutting against spring 386. When the oil pressure applied to chamber 390 through passage 316 acts on piston 388 with rotating shaft 48, plate 378, disc 384, and plates 380 and 379 are moved in the right direction of FIG. 3, so that plate 379 abuts against ring 382 and a frictional force is produced between disc 384 and plate 380. Therefore, the rotation speed of shaft 48 is reduced and is finally stopped. Since the frictional force, i.e., the engaging force of brake 54 increases in proportion to the magnitude of the above oil pressure, the magnitude of the engaging force can be controlled by controlling the oil pressure. When the oil pressure is reduced, spring 386 displaces piston 388 in the left direction of FIG. 3, and the frictional force between disc 384 and plate 380 is reduced, so that shaft 48 is finally rotatable with respect to casing 22.

Brake 54 also includes contact member 392 mounted on piston 388, and resistor 394, one end of which is connected to a power source, and the other end of which is grounded. When member 392 slides on resistor 394, a voltage appearing at an output terminal of member 392 varies, i.e., as piston 388 is displaced in the right direction, the voltage is decreased. Therefore, by detecting the above voltage, a position of piston 388 can be detected.

Control of oil pressures $P_C$ and $P_B$ applied to clutch 28 and brake 54 will be described below with reference to FIGS. 4A and 4B, and FIG. 5. For example, when a driver of a vehicle which runs by the gearshift range of the 3rd speed relatively largely depresses an accelerator pedal, unit 124 generates a downshift instruction, and control signals are output to valves 118 and 120 in accordance with the flow charts shown in FIGS. 4A and 4B to be described later so as to control oil pressures $P_C$ and $P_B$ applied to clutch 28 which is disengaged when the 2nd speed ratio is achieved and brake 54 which is engaged (while clutch 30 is held in the engaged state).

Control of oil pressure $P_C$ applied to clutch 28 as an engaging element to be disengaged will be described first in accordance with FIG. 4A.

When unit 124 generates the downshift instruction signal, control of oil pressure $P_C$ is started (step (1)), and the engaging force of clutch 28 is reduced. Then, in order to allow rotation of carriers 38 and 42, which is relative to shaft 26 rotating integrally therewith so as to start gearshift, predetermined value $P_C$ is subtracted from oil pressure $P_C$ (initially the line pressure) applied to clutch 28, and step (2) is executed to replace $P_C$ with the subtracted value. In step (3), processing is executed to output an instruction for operating valve 118 by the duty ratio corresponding to the replaced oil pressure $P_C$. In step (4), input shaft rotation speed Ni and output shaft rotation speed No (which corresponds to rotation speed of gear 64) are detected. In step (5), unit 124 determines whether speed Ni exceeds the product of speed No and the 3rd speed ratio, i.e., the speed ratio of shafts 26 and 62 varies to start the effective gearshift. If NO in step (5), $P_C$ is subtracted from the above subtracted $P_C$ and steps (2) to (5) are repeatedly executed to further reduce the engaging force of clutch 28 until YES in step (5) (area ① in FIG. 5). When the effective gearshift is started and YES in step (5), step (6) is execued to set a relatively large target rate of change $\dot{N}_X$ of speed Ni in a time interval (to be referred to as zone X) from start of the effective gearshift to the timing at which speed Ni reaches predetermined rotation speed $2(i_h+i_l)\cdot No/3$. Then, in step (7), unit 124 determines whether speed Ni reaches predetermined rotation speed $2(i_h+i_l)\cdot No/3$ (where $i_l$ represents the speed ratio of the 2nd speed). As is apparent from the above relation, the predetermined rotation speed representing the predetermined operation state of the transmission during gearshift represents the input shaft rotation speed slightly lower than speed Ni of the 2nd speed. After speed Ni reaches the predetermined rotation speed, the predetermined rotation speed serves as a condition for changing the target rate of change to be a relatively small value.

Note that by changing the target rate of change of speed Ni to be a small value so as to reduce changing speed of oil pressure $P_C$, speed Ni can be smoothly converged into the rotation speed corresponding to the 2nd speed without producing overshooting, hunting, and the like, and a total gearshift time can be reduced.

Since a change in speed Ni is very slight immediately after the start of gearshift, a determination result is NO in step (7), so that step (8) is executed to calculate effective rate of change of speed Ni and step (9) is executed to calculate difference $\Delta\dot{N}i$ between effective and target rates of changes Ni and $\dot{N}i$. Then, step (10) is executed to calculate correction oil pressure $\Delta P_C'$ corresponding to $\Delta\dot{N}i$ so that $\Delta\dot{N}i$ approaches "0", step (11) is executed to add $\Delta P_C'$ to initial oil pressure $P_C$ to obtain a new $P_C'$ step (12) is executed to operate valve 118 by the duty ratio corresponding to above $P_C'$ and then, speeds Ni and No are detected in step (13). Thereafter, the flow returns to step (7) (area ② in FIG. 5), and steps (7) to (13) are repeatedly executed several times. When unit 124 determines that speed Ni is increased to reach the predetermined rotation speed, step (14) is executed to set a relatively small target rate of change $\dot{N}_Y$ of speed Ni in a time interval (to be referred to as zone Y) from the end of zone X to the timing at which the effective gearshift is completed, and step (15) is executed to calculate the effective rate of change of speed Ni. Then, step (16) is executed to calculate difference $\Delta\dot{N}i$ between the effective and target rates of changes Ni and $\dot{N}_Y$, step (17) is executed to calculate correction oil pressure $\Delta P_C'$ corresponding to $\Delta\dot{N}i$ so that $\Delta\dot{N}i$ approaches "0", step (18) is executed to add $\Delta P_C'$ to initial oil pressure $P_C$ to obtain a new $P_C$, step (19) is executed to operate valve 118 by the duty ratio corresponding to the above new $P_C$, and unit 124 determines whether oil pressure $P_C$ reaches "0" in step (20). Since oil pressure $P_C$ does not reach "0" in zone Y before the effective gearshift is completed, a determination result becomes NO in step (20). After speed Ni is detected in step (21), the flow returns so step (15), and steps (15) to (21) are repeatedly executed.

On the other hand, in control of oil pressure $P_B$ applied to brake 54 to be described later, when speed Ni reaches the rotation speed corresponding to the 2nd speed and completion of the effective gearshift is detected, oil pressure $P_B$ is increased to increase the engaging force of brake 54. Therefore, effective rate of change $\dot{N}i$ of shaft 26 obtained in steps (21) and (15) goes to "0", and $\Delta\dot{N}i$ which is calculated in step (16) becomes a negative value. For this reason, if steps (15) to (21) are repeatedly executed, oil pressure $P_C$ is reduced to finally reach "0", and a determination result becomes YES in step (20), so that the control of oil pressure $P_C$ (i.e., gearshift) is completed (step (22), area ④ in FIG. 5).

Note that in the above control of oil pressure $P_C$, target rates of changes $\dot{N}_X$ and $\dot{N}_Y$ of speed Ni are set in accordance with a vehicle operating conditions such as a vehicle speed and an engine load at the start of gearshift or a given timing during gearshift.

The control of oil pressure $P_B$ applied to brake 54 as an engaging element to be engaged will be described below with reference to FIGS. 4B.

When unit 124 generates the downshift instruction signal, the control of oil pressure p- is started simultaneously with that of oil pressure $P_C$ (step (23)). First, in step (24), input shaft rotation speed Ni, output shaft rotation speed No, and position k (maximum at a zero stroke position and minimum at a full stroke position) of piston 388 of brake 54 are detected. Then, in step (25), unit 124 determines whether speed Ni equals to the product of speed No and 2nd speed ratio $i_l$, i.e., the above-mentioned effective gearshift is completed. If YES in step (25), control for increasing oil pressure $P_B$ is executed as described later. However, a determination result remains NO in step (25) until speed Ni reaches the rotation speed corresponding to the 2nd speed ratio by a controlling effect of oil pressure $P_C$.

If NO in step (25), unit 124 determines whether piston 388 is moved to a predetermined position (e.g., 0.6 mm before the full stroke position) immediately before a position where brake 54 engages. Since piston 388 does not start moving or reach the above predetermined position immediately after the start of gearshift, the determination result is k-0.6>0 in step (26). Therefore, step (27) is executed to add predetermined correction oil pressure $\Delta P_B$ to predetermined initial oil pressure $P_B$ applied to brake 54 and to replace original $P_B$ with added oil pressure $P_B+\Delta P_B$ as a new $P_B$. Then, step (28) is executed to operate valve 120 by the duty ratio corresponding to the new $P_B$, and the flow returns to step (24). Steps (24) to (28) are repeatedly executed, and when piston 388 is excessively moved toward the engaging direction and unit 124 determines that k-0.6<0 in step (26), step (29) is executed to subtract predetermined oil pressure $P_B$ from oil pressure $P_B$ and to replace initial $P_B$ with difference $(P_B-\Delta P_B)$ as the new $P_B$, and step (28) is executed. When piston 388 is moved to the predetermined position and unit 124 determines that k-0.6=0 in step (26), steps (24) to (26) are repeatedly executed until YES in step (25) while valve 120 is held in operation by the duty ratio corresponding to the oil pressure instructed in step (28). Note that in this case, if piston 388 is deviated from the predetermined position, steps (27) to (29) are so executed as to set piston 388 to the predetermined position until YES in step (25). The above control is executed in areas ①, ②, and ③ in FIG. 5. When speed Ni is increased by the above controlling effect of oil pressure $P_C$ applied to clutch 28 to complete the effective gearshift and the determination result becomes YES in step (25), determination step (30) is executed to determine whether oil pressure $P_B$ applied to brake 54 at the moment is line pressure $P_l$. However, as is apparent from steps (26) to (29), oil pressure $P_B$ has only a magnitude sufficient for holding piston 388 at the predetermined position, so that step (31) is executed to add predetermined oil pressure $\Delta P_B$ to oil pressure $P_B$ to obtain a the new oil pressure $P_B$ and step (32) is executed to operate valve 120 by the duty ratio corresponding to new oil pressure $P_B$. Thereafter, steps (30) to (32) are repeatedly executed until oil pressure $P_B$ equals to line pressure $P_l$. When oil pressure $P_B$ finally equals to line pressure $P_l$ and the determination result becomes YES In step (30), the control of the oil pressure, i.e., the gearshift is completed in step (33) (area ④ in FIG. 5).

Note that in the above embodiment, piston 388 stays at a position immediately before a position where brake 54 engages. However, piston 388 may stay at a position where brake 54 initially engages to obtain substantially same effect as that of the above embodiment.

In addition, a position sensor is used to detect a position of piston 388. However, a sensor for detecting the oil pressure in passage 316 or in the oil pressure chamber defined by casing 22 and piston 388 may be provided to detect the timing at which brake 54 starts engaging and the oil pressure starts increasing, thereby detecting the initial engaged state of brake 54.

Furthermore, in the above embodiment, the description has been made with reference to the case of power on downshift of the 3rd to 2nd speed ratio. However, it is a matter of course that similar control can be applied to power on downshift between other speed ratios.

According to the arrangement of the above embodiment, the effective gearshift can be achieved by controlling only the engaging force of clutch 28 as a disengaging-side engaging element while brake 54 as an engaging-side engaging element stays at the position immediately before the engaging position, and upon completion of the effective gearshift, brake 54 starts engaging. Therefore, torque transmission with respect to the output shaft is performed by the disengaging-side engaging element while the effective gearshift is executed, thereby effectively minimizing a drop in the output torque.

In addition, according to the arrangement of the above embodiment, speed Ni varies with a relatively large rate of change in the time interval (zone X) from start of the effective gearshift to the timing at which speed Ni reaches the predetermined value, and speed Ni varies with a relatively small rate of change in the time interval (zone Y) from the timing at which speed Ni reaches the predetermined value to end of the effective gearshift. Therefore, changing speed of the oil pressure applied to the disengaging-side engaging element (clutch 28) in zone Y can be reduced to smoothly converge speed Ni into the rotation speed corresponding to the 2nd speed, and the predetermined time of zone X can be reduced to reduce the total gearshift time.

Furthermore, when unit 124 is malfunctioned, all the solenoid valves are turned off. Therefore, the 3rd speed ratio, neutral, and reverse speed can be achieved, thereby eliminating the problem in which the vehicle cannot run at all.

According to the oil pressure control apparatus of the above embodiment, passages communicating with the engaging elements not relating to gearshift communicate with the discharging port by selector valves, thereby effectively eliminating the problem in which the oil pressure is applied to the engaging elements not relating to gearshift by malfunction and the like of the solenoid valves and the transmission is locked.

In addition, in the oil pressure control apparatus according to the above embodiment, oil pressure control valves 96 to 102, solenoid valves 116 to 122, and selector valves 104 to 114 excluding valve 108 are constituted by common components, thereby reducing manufacturing cost and preventing erroneous assembly.

Furthermore, since pump 86 is of a variable delivery type, oil can be delivered in a required minimal amount, thereby effectively reducing a load on an engine for driving pump 86.

According to the present invention, only the engaging force of the second engaging element is controlled to vary the input shaft rotation speed with the predetermined rate of change, and when the input shaft rotation speed corresponds to the rotation speed obtained when a relatively low speed ratio is achieved, i.e., after the effective gearshift is completed, the first engaging element staying at the position immediately before the engaging position or at the initial engaging position starts engaging. Therefore, the torque transmission with respect to the output shaft during gearshift can be performed by the second engaging element, thereby effectively minimizing the drop in the output shaft torque. In addition, engagement of both the engaging elements is switched (the engaging element for performing the torque transmission is switched) after completion of the effective gearshift, and the engaging force of the second engaging element rapidly decreases as that of the first engaging element increases. Therefore, when the engaging force of the first engaging element is rapidly increased without accurately controlling the overlap period of the engaging forces of both the engaging elements, the shock is less generated, thereby effectively achieving gearshift with less output shaft torque variations, i.e., less gearshift shock simply by increasing the engaging force of the first engaging element.

Furthermore, according to the present invention, during gearshift, the input shaft rotation speed varies with the first rate of change until the transmission reaches the predetermined operation state, and after the transmission reaches the predetermined operation state, the input shaft rotation speed varies with the second rate of change. Therefore, by setting the first rate of change larger than the second rate of change, gearshift with less shock can be effectively achieved without increasing the gearshift time.

What is claimed is:

1. A control apparatus for an automatic transmission gear system for vehicle, comprising:
   an input shaft to which a driving force of an engine is transmitted;
   selectively engageable first and second engaging elements;
   a control device having;
   engaging element switching means for engaging said first engaging element and for disengaging said second engaging element so as to achieve gearshift from a relatively high speed ratio to a relatively low speed ratio;
   controlling means for controlling engaging forces of said first and second engaging elements during the gearshift;
   instructing means for generating an instruction signal for starting the gearshift;
   input shaft rotation speed detecting means for detecting rotation speed of said input shaft; and changing rate detecting means for detecting changing rate of the rotation speed of said input shaft, wherein said control device, during the gearshift, when said engine is accelerating from the gearshift ratio of the relatively low speed ratio, moves said first engaging element to a position immediately before an engaging position or to an initial engaging position, controls the engaging force of said second engaging element such that the rotation speed of said input shaft changes with a first changing rate until said transmission gear system reaches a predetermined operation state and the rotation speed of said input shaft changes with a second changing rate smaller than said first changing rate after said transmission has reached said predetermined operation position, and increases the engaging force of said first engaging element when the rotation speed of said input shaft corresponds to the rotation speed of the relatively low speed ratio.

2. An apparatus according to claim 1, wherein the predetermined operation state is a state in which the rotation speed of said input shaft reaches a predetermined value.

3. An apparatus according to claim 2, wherein said automatic transmission gear system includes an output shaft and output shaft rotation speed detecting means for detecting the rotation speed of said output shaft, and the predetermined value of the rotation speed of said input shaft is determined in accordance with the ratio of the relatively high speed, the ratio of the relatively low speed, and the rotation speed of said output shaft.

4. An apparatus according to claim 1, wherein the position immediately before engagement and the initial engaging position are detected by a position sensor for detecting a displacement of an operation mechanism for operating said first engaging element.

5. An apparatus according to claim 1, wherein the position immediately before engagement and the initial engaging position are detected by an oil pressure sensor for detecting an oil pressure applied to an oil pressure mechanism for operating said first engaging element.

* * * * *